United States Patent
Oette et al.

(10) Patent No.: US 12,242,239 B2
(45) Date of Patent: Mar. 4, 2025

(54) METHOD FOR DETERMINING A PROPERTY OF A MACHINE, IN PARTICULAR A MACHINE TOOL, WITHOUT METROLOGICALLY CAPTURING THE PROPERTY

(71) Applicant: Schaeffler Technologies AG & Co. KG, Herzogenaurach (DE)

(72) Inventors: Cedric Oette, Erlangen (DE); Stefan Lieder, Nuremberg (DE); Matthias Hafner, Chemnitz (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 637 days.

(21) Appl. No.: 17/439,441

(22) PCT Filed: Mar. 4, 2020

(86) PCT No.: PCT/DE2020/100144
§ 371 (c)(1),
(2) Date: Sep. 15, 2021

(87) PCT Pub. No.: WO2020/192822
PCT Pub. Date: Oct. 1, 2020

(65) Prior Publication Data
US 2022/0187787 A1      Jun. 16, 2022

(30) Foreign Application Priority Data
Mar. 22, 2019   (DE) .................... 10 2019 107 363.4

(51) Int. Cl.
*G05B 19/00* (2006.01)
*G05B 19/18* (2006.01)
(Continued)

(52) U.S. Cl.
CPC ......... *G05B 19/406* (2013.01); *G05B 19/182* (2013.01); *G05B 23/0283* (2013.01)

(58) Field of Classification Search
None
See application file for complete search history.

(56) References Cited

U.S. PATENT DOCUMENTS 7,136,716 B2   11/2006   Hsiung et al.
8,781,982 B1   7/2014    Das et al.
(Continued)

FOREIGN PATENT DOCUMENTS

| CN | 103020643 A | 4/2013 |
|----|-------------|--------|
| CN | 109032829 A | 12/2018 |
| EP | 1650622 A1  | 4/2006 |

*Primary Examiner* — Paul B Yanchus, III
(74) *Attorney, Agent, or Firm* — Volpe Koenig

(57) ABSTRACT

A computer-implemented method determines a property of a machine, in particular a machine tool, without metrologically capturing the property. The method includes the following steps:
   capturing one or more first time series of one or more physical measurement variables of the machine;
   detecting change points in the one or more first time series;
   extracting pattern-sequence instances from the first time series on the basis of the detected change points;
   producing a plurality of pattern-sequence classes in accordance with the extracted pattern-sequence instances;
   identifying at least one characteristic of a plurality of pattern-sequence instances of the same pattern-sequence class and a time curve of the characteristic;
   determining a property of a machine using the determined characteristic and/or using the time curve of the determined characteristic.

17 Claims, 3 Drawing Sheets

(51) Int. Cl.
    *G05B 19/406*     (2006.01)
    *G05B 23/02*     (2006.01)

(56)     References Cited

U.S. PATENT DOCUMENTS

| | | |
|---|---|---|
| 2003/0061008 A1 | 3/2003 | Peacock et al. |
| 2007/0088550 A1 | 4/2007 | Pundarikaksha et al. |
| 2013/0197854 A1 | 8/2013 | Liao |
| 2015/0269050 A1 | 9/2015 | Filimonov |
| 2016/0091393 A1 | 3/2016 | Liao et al. |
| 2018/0164794 A1 | 6/2018 | Nikovski |
| 2018/0231969 A1* | 8/2018 | Noda ................ G05B 23/0283 |
| 2018/0314238 A1 | 11/2018 | Fujita et al. |
| 2020/0387141 A1* | 12/2020 | Nozaki .............. G06Q 10/0631 |

\* cited by examiner

METHOD FOR DETERMINING A PROPERTY OF A MACHINE, IN PARTICULAR A MACHINE TOOL, WITHOUT METROLOGICALLY CAPTURING THE PROPERTY

CROSS-REFERENCE TO RELATED APPLICATIONS

This application is the U.S. National Phase of PCT Appln. No. PCT/DE2020/100144 filed Mar. 4, 2020, which claims priority to DE 10 2019 107 363.4 filed Mar. 22, 2019, the entire disclosures of which are incorporated by reference herein.

TECHNICAL FIELD

The disclosure relates to a computer-implemented method for determining a property of a machine, in particular a machine tool, without metrologically capturing the property. The disclosure also relates to a system for determining a property of a machine, in particular a machine tool, without metrologically capturing the property. A further subject is a computer-implemented method for determining an expected level of quality of a component manufactured with a machine.

BACKGROUND

In the field of industrial component manufacturing, the machines, in particular machine tools, not only have to possess a high level of performance, but also a high level of availability. However, due to wear and tear, for example, there are often unexpected machine failures and/or quality deficits in the manufactured products. The reasons for such failures are often that the operating points of the machines have been unfavorably chosen or the condition of wear parts of the machine cannot be monitored directly.

Against this background, it is desirable to determine properties of a machine that are not captured metrologically in order to derive recommendations for action, for example for maintaining the machine or for optimizing the operating mode. This can be done, for example, by statistical calculations. However, changing operating modes or manufacturing different components on the same machine make it more difficult, in particular dynamically, to calculate the levels of wear and the service lives of the machine components.

US 2016/0 091 393 A1 describes a method for analyzing operating data of a machine in which machining methods are identified by comparing similar processes using an Interactive Closest Point (ICP) method. The processes are clustered. Deterioration of a tool is detected based on a trend in the operating data in a cluster of machining methods by means of a monotony test.

SUMMARY

It is desirable to specify a reliable method for determining a property of a machine without metrologically capturing the property.

In a method, one or more time series of one or more physical measurement variables of the machine are first captured. Such a time series is understood to mean a time curve of a physical measurement variable. Change points are then detected in the one or more individual time series, that is to say points or intervals in which a change occurs in the time curve of the particular measurement variable over time. These change points can be used as markers for intersections in the time series, which divide the time series into individual sequences. Using the detected change points, pattern-sequence instances are then extracted from the one or more individual time series. These pattern-sequence instances can be limited, for example, by the change points. A pattern-sequence instance can thus be formed by the time curve of the particular measurement variable between two detected change points. On the basis of the extracted pattern-sequence instances, a plurality of pattern-sequence classes are produced, i.e. identified in the set of extracted pattern-sequence instances. These pattern-sequence classes each include a plurality of pattern-sequence instances which have a certain similarity or a certain commonality. Then, at least one characteristic of a plurality of pattern-sequence instances of the same, in particular selected, pattern-sequence class is determined, as well as a time curve of this characteristic. Based on the identified characteristic and/or based on the time curve of the identified characteristic, the property of the machine is then identified in a subsequent method step, which does not have to be metrologically captured. It is thus possible to determine a physical effect that is not captured metrologically, in particular a physical variable or a status indication, such as, for example, the level of wear of a machine component. This enables the maintenance of the machine to be planned more precisely, increasing the availability of the machine.

The machine can be designed as a machine tool. Alternatively, it is possible that the machine is a robot, for example a manufacturing robot, a wind turbine, an automobile, an aircraft, a water-borne vehicle, a rail vehicle, or a medical device. In the case of physical measurement variables of such machines, there are sections that hardly contain any fault information or that generally have hardly any overlap with different types of information and are therefore particularly well-suited to extracting indirect information regarding a property of the machine, provided that suitable sensor signals are used with regard to the property of the machine.

The property of the machine may be an indication of a level of wear of the machine or a component of the machine. For example, the property can be a level of wear of a tool of the machine, in particular an indexable insert, a drill or a milling cutter, preferably at a tool center point (TCP) of the machine. Such information is often not directly detectable metrologically or is dependent on a plurality of physical measurement variables. The method makes it possible to reliably determine such information. Alternatively, the property of the machine may be an indication of a temperature in a predetermined area of the machine, for example in an area in which a temperature sensor for measuring the temperature cannot be arranged.

The one or more physical measurement variables of the machine may be a torque and/or a rotational speed and/or an electrical current and/or an electrical voltage and/or an energy and/or a temperature and/or or an acceleration and/or a speed and/or a force and/or a position.

The one or more physical measurement variables of the machine are preferably captured by a sensor device of the machine. The sensor device preferably comprises a torque sensor and/or a rotational speed sensor and/or a current sensor and/or a voltage sensor and/or an energy sensor and/or a temperature sensor and/or an acceleration sensor and/or a speed sensor and/or a force sensor and/or a position sensor. The sensor device is preferably a sensor device of the machine which is configured to transmit measurement variables captured during operation of the machine to a control device of the machine. It is therefore not necessary to provide an additional sensor device on the machine in order to identify the measurement variable required to carry out the method. For example, the sensor device can be a sensor device on an electric drive of the machine, which is used to control the drive while the machine is in operation.

Change points may be identified by an algorithm for change point detection. Alternatively or additionally, the detection of change points in the one or more time series can include the detection of predetermined change sequences. The predetermined change sequences can be stored in a change sequence memory, which is preferably provided in a device separate from the machine, in particular located remotely, for example in a cloud storage device that is connected to the machine via a communication link, in particular a communication network. The predetermined change sequences can consist, for example, of at least three points which define a predetermined sequence of gradients of the time series.

The detection of change points in the one or more first time series mat take place directly on the basis of the time series, i.e. in the time domain, for example by forming a derivative of the time series and/or by means of the Douglas-Peucker algorithm. Alternatively or additionally, the detection of change points in the one or more first time series can take place indirectly using a transformation of the time series, for example using a Fourier transform or a wavelet transform. Pre-processing of the time series is preferably carried out before the detection of change points and/or post-processing of the detected change points takes place after the detection of change points.

The extraction of pattern-sequence instances from the first time series based on the detected change points preferably includes identifying a candidate sequence between two change points. Such a candidate sequence is a sequence of the time series which possibly represents a pattern-sequence instance. The length of the particular candidate sequence can be compared with a predetermined minimum sequence length. Alternatively, it can be verified whether the length of the particular candidate sequence lies in a predetermined sequence length range. The candidate sequence is preferably only viewed as a pattern-sequence instance if the length of the candidate sequence is greater than or equal to the predefined minimum sequence length or if the length of the candidate sequence lies in the predefined sequence length range.

It has proved to be advantageous if, when generating a plurality of pattern-sequence classes an unsupervised machine learning method is carried out. In such an unsupervised machine learning method, pattern-sequence classes are recognized in input data that comprise the pattern-sequence instances, so that the assignment of individual pattern-sequence instances to pattern-sequence classes is then known. For example, a plurality of pattern-sequence classes can be generated by a principal component analysis or by a k-means algorithm.

It is advantageous if the generation of pattern-sequence classes includes a comparison of a plurality of candidate sequences. Preferably, curves of a plurality of candidate sequences, in particular a sequence of sections with different gradients, are compared with one another. The comparison preferably includes the determination of a degree of similarity between a plurality of candidate sequences. A plurality of candidate sequences are preferably assigned to the same pattern-sequence class if the determined degree of similarity is greater than a predefined similarity threshold value. To determine the degree of similarity, at least one mathematical distance between two candidate sequences can be determined, for example a Wasserstein distance (Kantorovich-Rubinstein metric) and/or a total variation distance and/or a Kolmogorov-Smirnov distance and/or a dynamic time warping distance.

Alternatively or additionally, the comparison can include the determination of a distribution of data in the candidate sequences, for example a histogram comparison or a correlation. As another alternative, the comparison of two candidate sequences can include the comparison of the following characteristics: mean, number of peaks.

The generation of a plurality of pattern-sequence classes may be carried out in two sub-steps: In a first sub-step, a plurality of, in particular all, candidate sequences are compared with one another in order to determine a similarity between two candidate sequences. In a second sub-step, a plurality of similar candidate sequences are aggregated in a new pattern-sequence class, unless there is already an existing pattern-sequence class that is suitable due to the similarity and to which they can be assigned. In order to determine similar pattern-sequence classes as quickly as possible, a comparison is preferably first made with the pattern-sequence classes that have recently occurred most frequently.

The following method step may be carried out after the generation of the pattern-sequence classes:

Assigning the pattern-sequence classes to operating states of the machine and/or a component of the machine and/or a tool of the machine in accordance with operating state information provided by a control unit of the machine.

In this further method step, the produced pattern-sequence classes are assigned to different operating states of the machine, wherein this is able to take place in accordance with operating state information which, corresponding to the time series of the particular measurement variable, depicts the time curve of the operating state of the machine. This operating state information is provided by a control unit of the machine and enables a contextual relationship to be established between the pattern-sequence classes and the operating state of the machine. The control unit of the machine can determine the operating state information using a program code for controlling the machine, for example using a CNC (computerized numerical control) program code. A pattern-sequence class may be selected which is assigned to an operating state that is characteristic of the property of the machine to be determined.

It may be verified whether the pattern-sequence class, in particular all pattern-sequence instances of a pattern-sequence class, can be assigned to exactly one operating state of the machine and/or a component of the machine and/or a tool of the machine, for example an operation of the machine with the same tool. If the pattern-sequence class or the pattern-sequence instances of the pattern-sequence class can be assigned to a plurality of operating states, the pattern-sequence class is preferably divided into a plurality of new pattern-sequence classes, wherein each of these new pattern-sequence classes are assigned to exactly one operating state.

The pattern-sequence classes may each be assigned an identifier and sequences of pattern-sequence classes are identified in the first time series. These sequences of pattern-sequence classes are described by sequences of their identifiers, or so-called identifying sequences. Patterns are preferably determined in the identifying sequences, in particular, for example, by string clustering and/or by solution methods for the common approximate subsequence problem. Identification of the patterns can be done hierarchically, that is, repeatedly on the result, and thereby also enables the recognition of sequences of operating states of the machine and/or a component of the machine and/or a tool of the machine. In this way, products manufactured with the machine or manufacturing processes carried out by the machine can be recognized.

The following method step may be carried out after the generation of the pattern-sequence classes:

Assigning the pattern-sequence classes to operating states of the machine and/or a component of the machine and/or a tool of the machine in accordance with operating state information provided by an operator of the machine or a system that is superordinate to the machine.

In this further method step, the produced pattern-sequence classes are assigned to different operating states of the machine and/or a component of the machine and/or a tool of the machine, and this is able to take place in accordance with operating state information which, corresponding to the time series of the particular measurement variable, represents the time curve of the operating state of the machine. This operating state information is provided by an operator of the machine or a system that is superordinate to the machine. Such a system can be, for example, a manufacturing execution system (MES).

The identified characteristic of the plurality of pattern-sequence instances may be an average value of a pattern-sequence instance and/or a maximum value of a pattern-sequence instance and/or a minimum value of a pattern-sequence instance. Alternatively or additionally, the characteristic can result from a transformation of the pattern-sequence instances, for example using a transformation into the frequency domain, in particular a Fourier transform or a wavelet transform. The characteristic can thus be a characteristic identified in the time domain or a characteristic identified in a transformation space, in particular in the frequency domain, or a combination of a characteristic identified in the time domain and a characteristic identified in a transformation space, in particular in the frequency domain. The characteristic can correlate with the property of the machine according to a target function. This target function is preferably defined in that it is entered by an operator of the machine or it is determined automatically, for example via a regression, via a neural network or similar.

In addition to identifying at least one (first) characteristic of a plurality of pattern-sequence instances of a (first) pattern-sequence class and a time curve of the (first) characteristic, at least one additional (second) characteristic of a plurality of pattern-sequence instances of an additional (second) pattern-sequence class and a time curve of this additional (second) characteristic may be identified. In this context, it is preferably provided that the property of the machine is determined based on the plurality of (first and second) identified characteristics and/or on the basis of the time curve of the plurality of (first and second) identified characteristics.

The following method step may be carried out after determining the property of the machine:

training of a self-learning determination module using the first time series and the identified curve of the characteristic.

The self-learning determination module is preferably configured to perform a supervised machine learning method. Methods that use neural networks, in particular deep learning methods or multivariate analysis methods, in particular regression methods, are particularly suitable as methods for supervised machine learning. In such training, the first time series can be specified as input values and the identified curve of the characteristic can be specified as (presumed) output values of a training data set. Training can also include giving the self-learning determination module the identified pattern-sequence instances and/or a pattern-sequence representative of the particular pattern-sequence class and/or information on the property to be identified.

The following method steps may be carried out after the training of the self-learning determination module:

Capturing of one or more second time series of one or more physical measurement variables;

Determining the property of the machine, which does not have to be metrologically captured, by the trained determination module in accordance with the one or more second time series.

In this respect, during operation of the machine, the trained determination module can be used to determine the property solely on the basis of the captured second time series. Using the trained determination module makes it possible (after training) to dispense with the further detection of change points in the (second) time series and the extraction of pattern-sequences in this (second) time series. Rather, the property of the machine can be determined exclusively by the trained determination module. In this way, the determination of the property can be accelerated and/or performed with a reduced computational effort.

In this context, it has proven to be advantageous if the (trained) determination module is provided in a processing unit of the machine and a module for training the determination module is provided separately from the machine, for example as a cloud processing unit. The detection of change points and/or the extraction of pattern-sequence instances and/or the generation of pattern-sequence classes and/or the identification of the characteristic is also preferably carried out by means of a module that is provided separately from the machine, for example as a cloud computing unit. This has the advantage that such method steps, which are only required initially or for training the determination module, do not have to be kept in a computing unit of the machine, so that it can be designed with less hardware and/or software outlay.

In a computer-implemented method for determining an expected level of quality of a component manufactured with a machine, a method described above is carried out for determining a property of a machine, wherein the property of the machine is a level of wear of the machine and the expected level of quality of a component manufactured with the machine is determined on the basis of this level of wear, determined by the trained determination module, in accordance with the one or more second time series. This makes it possible, based on the determined property of the machine and the time series, in particular in combination with all the processing options described above, to draw a conclusion about the expected level of quality of a component manufactured with this machine.

A system for determining a property of a machine, in particular a machine tool, without metrologically capturing the property, includes a processor which is configured to carry out a method described above for determining a property of a machine.

The same advantages can be achieved with the system as have been described in connection with the method for determining a property of a machine.

The system may have a first unit which is configured for arrangement in the area of the machine, and a second unit which is configured for arrangement separately from the machine, in particular as part of a cloud, wherein the second unit comprises a memory device in which the produced pattern-sequence classes are stored. The arrangement of the memory device for the pattern-sequence classes makes it possible to use a common memory device for a large number of machines. The pattern-sequence classes can be stored as part of a common database for a plurality of identical or different machines, wherein the pattern-sequence classes are preferably assigned operating states of the machine and/or a component of the machine and/or a tool of the machine.

In this context it has proven to be advantageous if the first unit has a buffer storage device in which a subset of the pattern-sequence classes stored in the storage device of the second unit are stored. Pattern-sequence classes that are frequently used are preferably stored in the buffer storage device, for example those pattern-sequence classes that have been used in a prior time period. This can speed up access to frequently used pattern-sequence classes.

The use of a system mentioned above for determining a level of wear of a machine designed as a machine tool or as an industrial robot is also described.

A computer program includes commands which, when the computer program is executed by a computer, cause the computer to carry out a method described above for determining a property of a machine.

A computer-readable medium includes commands which, when the commands are executed by a computer, cause the computer to carry out a method explained above for determining a property of a machine.

BRIEF DESCRIPTION OF THE DRAWINGS

Further details and advantages will be explained below with reference to an exemplary embodiment shown in the drawings. In the figures.

DETAILED DESCRIPTION

Figure 1:
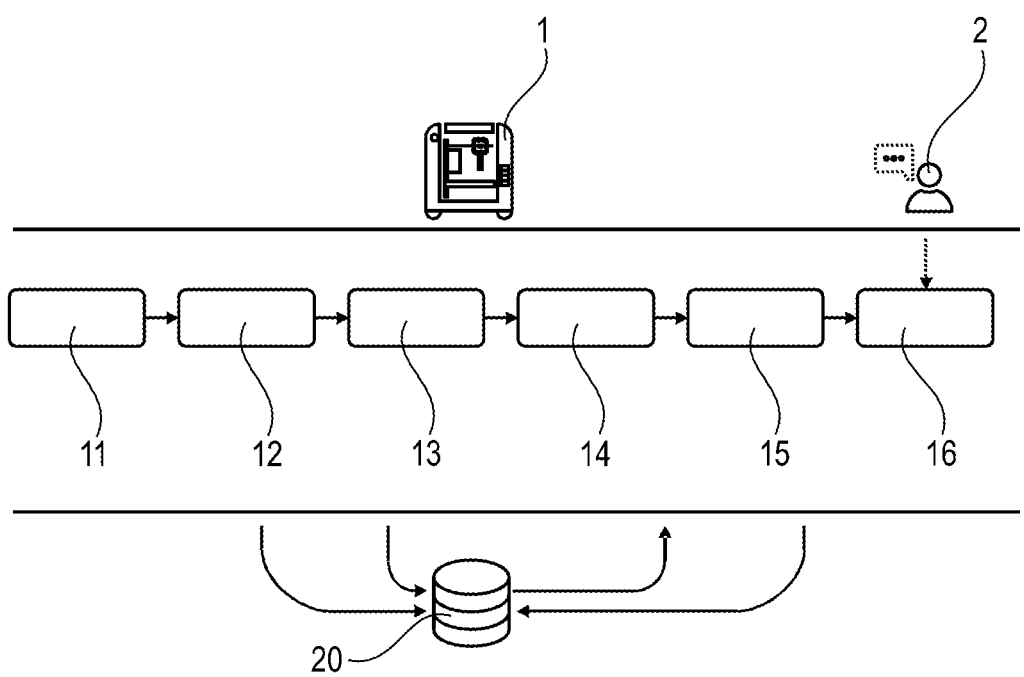
FIG. 1 shows a flow chart of a method for determining a property of a machine.

FIG. 1 shows a schematic flow chart of a method for determining a property of a machine 1 designed as a machine tool, wherein the property does not have to be metrologically captured. In the present exemplary embodiment, a level of wear, in particular at the tool center point, is identified as a property.

In this method, one or more time series of one or more physical measurement variables are captured by sensor devices arranged on the machine 1. The sensor devices preferably include sensors that are installed in the machine 1 in order to enable a target/actual comparison during operation of the machine 1 and/or to control the machine 1. In this respect, it is not necessary to provide additional sensors on the machine in order to carry out the method. At the same time, the method can be carried out with sensors that are provided in addition to the sensors already present on the machine 1.

Figure 2:
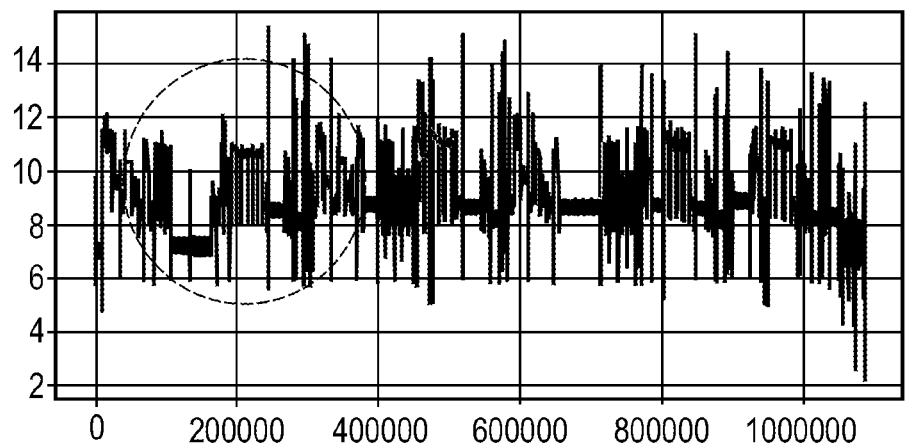
FIG. 2 shows an exemplary time series of a physical measurement variable of a machine.

An exemplary time series of a measurement variable is shown in FIG. 2. The measurement variable can be, for example, an amplitude of a current in an electric motor that is configured to drive a component of the machine 1, for example to drive a tool of machine 1. For example, the electric motor can be the motor of a spindle with a tool holder for a tool of the machine 1.

Figure 3:
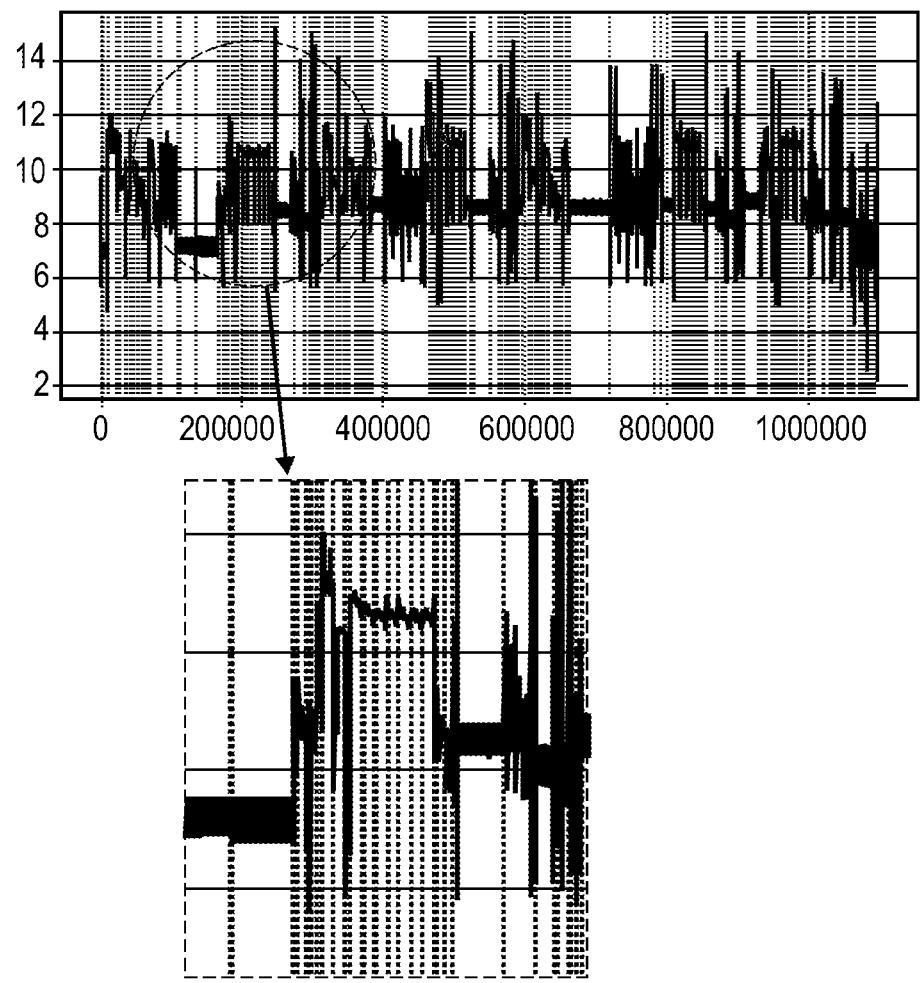
FIG. 3 shows the exemplary time series with marked change points.

The captured time series are evaluated in order to determine the level of wear. In a detection step 11, change points in the one or more first time series are detected. An algorithm for change point detection is preferably used in order to determine change points in the time series, in particular certain change points at which the curve of the particular time series changes. Such change points are represented by vertical lines in FIG. 3.

In an extraction step 12 following the detection step 11, pattern-sequence instances are extracted from the particular time series based on the detected change points. For this purpose, so-called candidate sequences are first identified between two change points. It is verified whether such a candidate sequence has at least a predetermined minimum sequence length. Candidate sequences which have a length less than the minimum sequence length are discarded. The compared other candidate sequences are viewed as a pattern-sequence instance.

Figure 4:
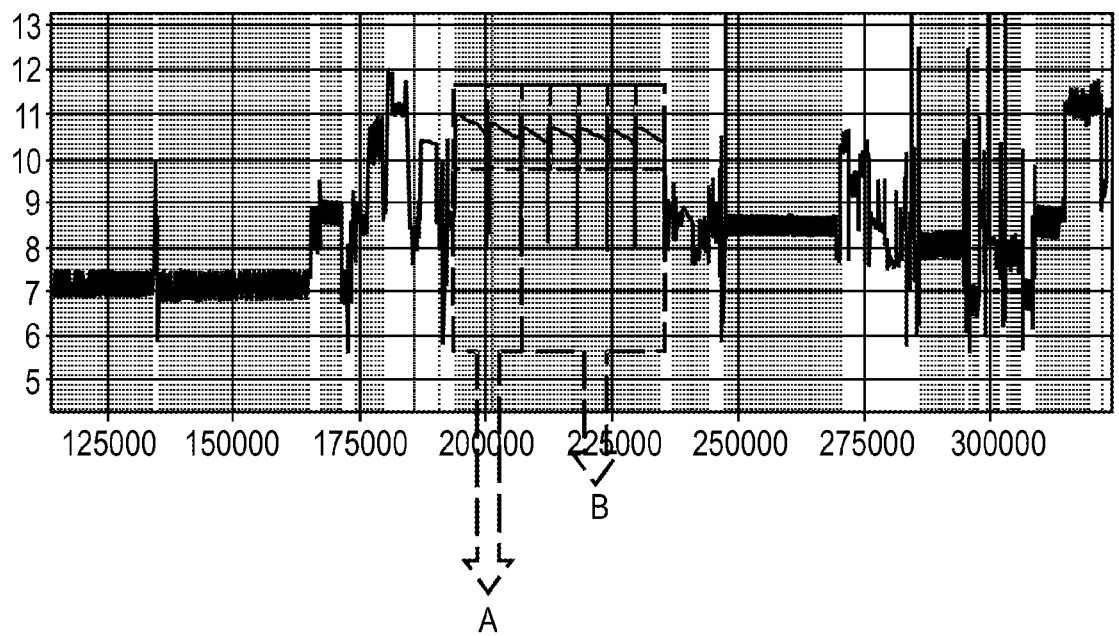
FIG. 4 shows an exemplary time series with extracted pattern-sequence instances.

In a subsequent class production step 13, a plurality of pattern-sequence classes are then produced in accordance with the extracted pattern-sequence instances. An unsupervised machine learning method is used here, in which pattern-sequence classes are automatically recognized in the set of pattern-sequence instances without the assignment of individual pattern-sequence instances to pattern-sequence classes being known in advance. FIG. 4 shows a time series in which two first pattern-sequence instances that are assigned to a first pattern-sequence class A and five second pattern-sequence instances that are assigned to a second pattern-sequence class B have been recognized. Identifiers, or so-called labels, which are produced solely by the unsupervised machine learning method, can be assigned to these pattern-sequence classes A and B. It is also possible to use a priori knowledge and/or human knowledge in order to obtain suitable identifiers for the identified pattern-sequence classes which have a semantic meaning. Human knowledge can be introduced, for example, as part of a query step in which a user of the machine assigns an identifier, in particular with a semantic meaning, to the identified pattern-sequence classes.

In a further method step, the produced pattern-sequence classes are assigned to different operating states of the machine. This assignment takes place in accordance with operating state information, which, corresponding to the time series of the particular measurement variable, depicts the time curve of the operating state of the machine. Such operating state information is provided by a control unit of the machine and enables a contextual relationship to be established between the pattern-sequence classes and the operating state of the machine. The control unit of the machine can determine the operating state information using a program code for controlling the machine, for example using a CNC program code. In this way it can be identified, for example, that pattern-sequence class B shown in FIG. 4 corresponds to an operating state in which a tool of the machine 1 is rotated and pattern-sequence class A corresponds to a preparatory step preceding the rotation of the tool.

Figure 5:
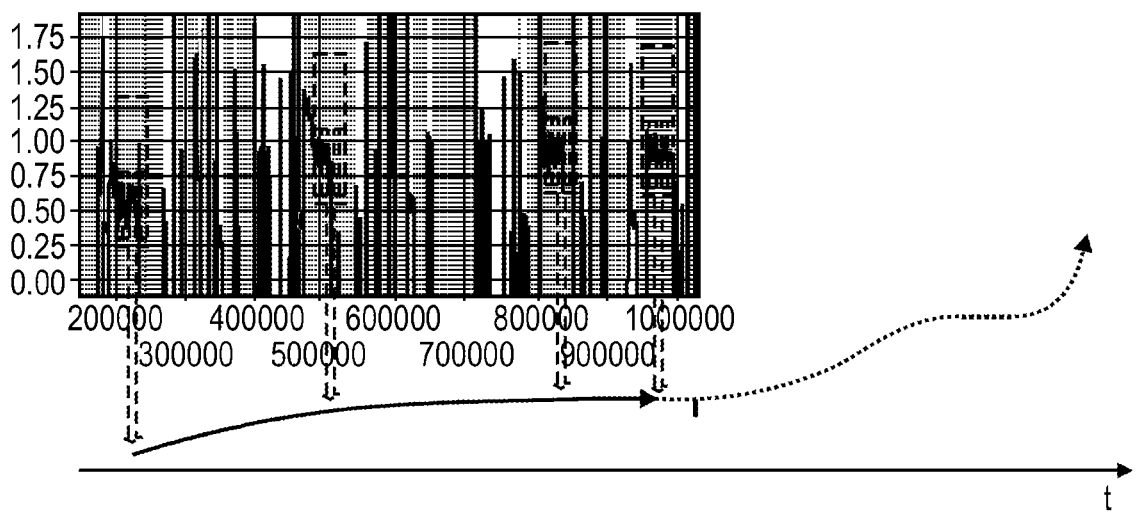
FIG. 5 shows an exemplary time series with extracted pattern-sequence instances of the same pattern-sequence class and a time curve of an exemplary characteristic of the pattern-sequence instances.

In an identification step 14, at least one characteristic of a plurality of pattern-sequence instances of the same pattern-sequence class, in particular of all pattern-sequence instances of the same pattern-sequence class, is then identified and a time curve of this characteristic is created, see FIG. 1. The characteristic can be, for example, an average value of the pattern-sequence instances or the standard deviation. However, other characteristics are also conceivable, such as, for example, a maximum value, a minimum value or a variable identified on the basis of a Fourier or wavelet transform. An exemplary curve of such a characteristic is shown schematically in FIG. 5. The property to be determined, here the level of wear, especially at the tool center point, depends on this characteristic. The property of the machine can then be determined on the basis of the identified characteristic and/or on the basis of the time curve of the identified characteristic.

Optionally, in a prediction step 15, in addition to determining the property, a prediction on the subsequent curve of the property can be obtained. For this purpose, as indicated by the dashed line in FIG. 5, a prediction is made about the curve of the characteristic, and from this a conclusion is drawn about the property to be determined. The prediction can be determined statistically or using a simulation.

An identifier is assigned to each of the pattern-sequence classes—here the identifiers A and B. Optionally, a sequence of these pattern-sequence classes A and B can be identified in the time series. These sequences of pattern-sequence classes are described by sequences of their identifiers, or so-called identifying sequences. Patterns are preferably determined in the identifying sequences, in particular, for example, by string clustering and/or by solution methods for the common approximate subsequence problem. Identification of the patterns can be done hierarchically, that is, repeatedly on the result, and thereby also enables the recognition of sequences of operating states of the machine and/or a component of the machine and/or a tool of the machine. In this way, products manufactured with the machine or manufacturing processes carried out by the machine can be recognized.

Optionally, it can be provided that, following the determination of the property of the machine, a self-learning determination module is trained by means of the first time series and the identified curve of the characteristic, see training step 16 in FIG. 1. The self-learning determination module is preferably configured to carry out a supervised machine learning method. During training, the first time series is given as the input values and the previously identified curve of the characteristic is given as the output value of a training data set. Training can also include giving the self-learning determination module the identified pattern-sequence instances and/or a pattern-sequence representative of the particular pattern-sequence class and/or information on the property to be identified.

After training, the self-learning determination module can be used to automatically evaluate the newly-captured second time series and to use these to determine the property of the machine to be determined. A direct translation from the captured time series to the property of the machine, here the level of wear, is therefore possible. For this purpose, the trained determination module does not have to carry out the previously described method steps 11-15. Rather, the knowledge accumulated in the trained determination module through the training allows the property to be determined solely on the basis of the newly-captured time series, which reduces the computational effort. The trained self-learning determination module thus carries out the following method steps:

Capturing of one or more second time series of one or more physical measurement variables;

Determining the property of the machine, which does not have to be metrologically captured, by the trained determination module in accordance with the one or more second time series.

It is advantageous if the trained determination module is provided in a processing unit of the machine and a module for training the determination module is provided separately from the machine 1, for example as a cloud processing unit. The detection of change points and/or the extraction of pattern-sequence instances and/or the generation of pattern-sequence classes and/or the identification of the characteristic is also preferably carried out by means of a module that is provided separately from the machine, for example as a cloud computing unit. This has the advantage that such method steps, which are only required initially or for training the determination module, do not have to be kept in a computing unit of the machine, so that it can be designed with less hardware and/or software outlay. All of the data required for training the determination module, for example the pattern-sequence classes, can also be stored in a cloud storage device 20 which is arranged remotely from the machine 1 and is connected to the machine via a network.

Furthermore, a computer-implemented method for determining an expected level of quality of a component manufactured with the machine 1 can be carried out, wherein a method described above is carried out for determining a property of the machine 1, wherein the property of the machine is a level of wear of the machine and the expected level of quality of a component manufactured with the machine is determined on the basis of this level of wear, determined by the trained determination module, in accordance with the one or more second time series.

This makes it possible, based on the determined property of the machine 1, to draw a conclusion about the expected level of quality of a component manufactured with this machine 1.

The invention claimed is:

1. A Computer-implemented method for determining a property of a machine without metrologically capturing the property, the method comprising:
    capturing one or more first time series of one or more physical measurement variables of the machine;
    detecting change points in the one or more first time series;
    extracting pattern-sequence instances from the first time series on the basis of the detected change points;
    producing a plurality of pattern-sequence classes in accordance with the extracted pattern-sequence instances;
    identifying at least one characteristic of a plurality of pattern-sequence instances of the same pattern-sequence class and a time curve of the characteristic;
    determining a property of a machine using the identified characteristic and/or using the time curve of the identified characteristic; and
    assigning the pattern-sequence classes to operating states of the machine and/or a component of the machine and/or a tool of the machine,
    wherein the assigning the pattern sequence classes comprises
        assigning a first pattern pattern-sequence class to a first operating state in which the tool is in a preparatory step preceding a rotation of the tool, and
        assigning a second pattern pattern-sequence class assigned to a second operating state in which the tool is rotated.

2. The Computer-implemented method according to claim 1, wherein the property of the machine is an indication of a level of wear of the machine or of a component of the machine or of a temperature in a predetermined area of the machine.

3. The Computer-implemented method according to claim 1, wherein the one or more physical measurement variables of the machine is a torque and/or a rotational speed and/or an electrical current and/or an electrical voltage and/or an energy and/or a temperature and/or an acceleration and/or a speed and/or a force and/or a position.

4. The Computer-implemented method according to claim 1, wherein the one or more physical measurement variables of the machine are detected by a sensor device of the machine.

5. The Computer-implemented method according to claim 1, wherein the detection of change points in the one or more time series comprises the detection of predetermined change sequences.

6. The Computer-implemented method according to claim 1, wherein the change points in the one or more first time series are detected directly on the basis of the time series and/or are detected indirectly on the basis of a transformation of the time series.

7. The Computer-implemented method according to claim 1, wherein the extraction of pattern-sequence instances from the first time series based on the detected change points comprises identifying a candidate sequence between two change points.

8. The Computer-implemented method according to claim 1, wherein a plurality of pattern-sequence classes are generated by an unsupervised machine learning method.

9. The Computer-implemented method according to claim 1, wherein the identified characteristic is an average value of a pattern-sequence instance and/or a maximum value of a pattern-sequence instance and/or a minimum value of a pattern-sequence instance.

10. The Computer-implemented method according to claim 1, further comprising, after determining the property of the machine,
training a self-learning determination module using the first time series and the identified curve of the characteristic.

11. The Computer-implemented method according to claim 10, further comprising, after training the self-learning determination module:
capturing of one or more second time series of one or more physical measurement variables;
determining the property of the machine, which does not have to be metrologically captured, by the trained determination module in accordance with the one or more second time series.

12. The Computer-implemented method according to claim 11, wherein the property of the machine is a level of wear of the machine and the expected level of quality of a component manufactured with the machine is determined on the basis of this level of wear, determined by the trained determination module, in accordance with the one or more second time series.

13. A System for determining a property of a machine without metrologically capturing the property, said system comprising a processor which is configured to carry out a method according to claim 1.

14. The System according to claim 13, wherein the system has a first unit arranged in the area of the machine, and a second unit arranged separately from the machine as part of a cloud, wherein the second unit comprises a memory device in which the produced pattern-sequence classes are stored.

15. The Computer-implemented method according to claim 1 wherein the pattern-sequence classes are assigned to operating states in accordance with operating state information provided by a control unit of the machine.

16. The Computer-implemented method according to claim 1 wherein the pattern-sequence classes are assigned to operating states in accordance with operating state information provided by an operator of the machine.

17. The Computer-implemented method according to claim 1 wherein the pattern-sequence classes are assigned to operating states in accordance with operating state information provided by a system that is superordinate to the machine.

* * * * *